(12) United States Patent
van Beek (10) Patent No.: US 7,652,994 B2
(45) Date of Patent: Jan. 26, 2010

(54) ACCELERATED MEDIA CODING FOR ROBUST LOW-DELAY VIDEO STREAMING OVER TIME-VARYING AND BANDWIDTH LIMITED CHANNELS

(75) Inventor: Petrus J. L. van Beek, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 621 days.

(21) Appl. No.: 11/394,573

(22) Filed: Mar. 31, 2006

(65) Prior Publication Data

US 2007/0236599 A1    Oct. 11, 2007

(51) Int. Cl.
*H04L 1/00* (2006.01)
(52) U.S. Cl. ........................ 370/232; 370/465
(58) Field of Classification Search ......... 370/229–234, 370/465–468
See application file for complete search history.

(56) References Cited

U.S. PATENT DOCUMENTS

| | | | |
|---|---|---|---|
| 5,159,447 A | 10/1992 | Haskell et al. | |
| 5,506,686 A | 4/1996 | Auyeung et al. | |
| 5,541,852 A | 7/1996 | Eyuboglu et al. | |
| 5,546,377 A | 8/1996 | Ozveren | |
| 5,936,940 A | 8/1999 | Marin et al. | |
| 5,978,236 A | 11/1999 | Faberman et al. | |
| 5,982,778 A | 11/1999 | Mangin et al. | |
| 5,995,705 A | 11/1999 | Lang | |
| 6,014,694 A | 1/2000 | Aharoni et al. | |
| 6,049,549 A | 4/2000 | Ganz et al. | |
| 6,055,578 A | 4/2000 | Williams et al. | |
| 6,167,084 A | 12/2000 | Wang et al. | |
| 6,167,253 A | 12/2000 | Farris et al. | |
| 6,233,226 B1 | 5/2001 | Gringeri et al. | |
| 6,263,503 B1 | 7/2001 | Margulis et al. | |
| 6,275,497 B1 | 8/2001 | Varma et al. | |
| 6,275,531 B1 | 8/2001 | Li | |
| 6,292,834 B1 | 9/2001 | Ravi et al. | |
| 6,300,665 B1 | 10/2001 | Peeters et al. | |

(Continued)

FOREIGN PATENT DOCUMENTS

EP    1 026 855    6/2000

(Continued)

OTHER PUBLICATIONS

"IEEE Wireless LAN Edition: A compilation based on IEEE Std 802.11—1999 (R2003) and its amendments," IEEE Standards Information Network, IEEE Press, Copyright 2003.

(Continued)

*Primary Examiner*—Ricky Ngo
*Assistant Examiner*—Pao Sinkantarakorn
(74) *Attorney, Agent, or Firm*—Chernoff, Vilhauer, McClung & Stenzel (57) ABSTRACT

A system includes effective transmission of compressed audio/video stream as a sequence of audio/video (AV) data units. The system includes a transcoder that transcodes the data at different data unit rates. The system also includes a transmitter that transmits the data units at different average data unit rates. A controller controls the bit rate at which the transcoder transcodes the data units in conjunction with the data unit rate per second at which the transmitter transmits the said transcoded data stream.

21 Claims, 7 Drawing Sheets

Media transmission system with audio/video storage and transcoder at sender

U.S. PATENT DOCUMENTS

| | | | |
|---|---|---|---|
| 6,310,495 B1 | 10/2001 | Zhang | |
| 6,343,085 B1 | 1/2002 | Krishnan et al. | |
| 6,351,153 B1 | 2/2002 | Fischer | |
| 6,363,056 B1 | 3/2002 | Beigi et al. | |
| 6,434,606 B1 | 8/2002 | Borella et al. | |
| 6,456,591 B1 | 9/2002 | Mishra | |
| 6,459,811 B1 | 10/2002 | Hurst, Jr. | |
| 6,542,467 B2 | 4/2003 | Umayabashi | |
| 6,587,875 B1 | 7/2003 | Ogus | |
| 6,590,936 B1 | 7/2003 | Kadono | |
| 6,598,228 B2 | 7/2003 | Hejna | |
| 6,665,751 B1 | 12/2003 | Chen et al. | |
| 6,700,869 B1 | 3/2004 | Falco et al. | |
| 6,741,565 B1 | 5/2004 | Wicklund | |
| 6,747,991 B1 | 6/2004 | Hemy et al. | |
| 6,988,144 B1 | 1/2006 | Luken et al. | |
| 2001/0047423 A1 | 11/2001 | Shao et al. | |
| 2002/0010938 A1 | 1/2002 | Zhang et al. | |
| 2002/0054578 A1 | 5/2002 | Zhang et al. | |
| 2002/0075857 A1 | 6/2002 | LeBlanc | |
| 2002/0085587 A1 | 7/2002 | Mascolo | |
| 2002/0101880 A1 | 8/2002 | Kim | |
| 2002/0114393 A1 | 8/2002 | Vleeschouwer | |
| 2002/0126891 A1 | 9/2002 | Osberger | |
| 2002/0136298 A1 | 9/2002 | Anantharamu et al. | |
| 2002/0140851 A1 | 10/2002 | Laksono | |
| 2002/0169880 A1 | 11/2002 | Loguinov et al. | |
| 2002/0186660 A1 | 12/2002 | Bahadiroglu | |
| 2003/0016630 A1 | 1/2003 | Vega-Garcia et al. | |
| 2003/0035133 A1 | 2/2003 | Berkema et al. | |
| 2003/0067872 A1 | 4/2003 | Harrell et al. | |
| 2003/0067877 A1 | 4/2003 | Sivakumar et al. | |
| 2003/0095594 A1 | 5/2003 | Laksono et al. | |
| 2003/0101274 A1 | 5/2003 | Yi et al. | |
| 2003/0152032 A1 | 8/2003 | Yanagihara et al. | |
| 2003/0189589 A1 | 10/2003 | LeBlanc et al. | |
| 2004/0017773 A1 | 1/2004 | Piche et al. | |
| 2004/0045030 A1 | 3/2004 | Reynolds et al. | |
| 2004/0057381 A1 | 3/2004 | Tseng et al. | |
| 2004/0071096 A1 | 4/2004 | Na et al. | |
| 2004/0086268 A1 | 5/2004 | Radha et al. | |
| 2004/0153951 A1 | 8/2004 | Walker et al. | |
| 2004/0170186 A1 | 9/2004 | Shao et al. | |
| 2004/0190515 A1 | 9/2004 | Nogima et al. | |
| 2004/0204041 A1 | 10/2004 | Fillebrown et al. | |
| 2004/0252759 A1 | 12/2004 | Winder et al. | |
| 2004/0255328 A1 | 12/2004 | Baldwin et al. | |
| 2005/0007956 A1* | 1/2005 | Nilsson et al. | 370/252 |
| 2005/0041689 A1 | 2/2005 | Wu et al. | |
| 2005/0055201 A1 | 3/2005 | Florencio et al. | |
| 2005/0094622 A1 | 5/2005 | Mallila | |
| 2005/0105469 A1 | 5/2005 | Hao | |
| 2005/0152465 A1 | 7/2005 | Maltsev et al. | |
| 2005/0169174 A1 | 8/2005 | Apostolopoulos et al. | |
| 2005/0195821 A1 | 9/2005 | Yun et al. | |
| 2005/0213502 A1* | 9/2005 | Convertino et al. | 370/468 |
| 2005/0216950 A1 | 9/2005 | MacInnis | |
| 2006/0045020 A1 | 3/2006 | Picco et al. | |
| 2006/0077993 A1 | 4/2006 | Pereira et al. | |
| 2006/0165166 A1 | 7/2006 | Chou et al. | |
| 2006/0198392 A1* | 9/2006 | Park et al. | 370/468 |
| 2007/0263657 A1 | 11/2007 | Sugar et al. | |
| 2008/0259792 A1 | 10/2008 | Cimini et al. | |

FOREIGN PATENT DOCUMENTS

| | | | |
|---|---|---|---|
| EP | 1 047 223 A2 | | 10/2000 |
| EP | 1 047 223 A3 | | 2/2001 |
| EP | 1 179 925 A2 | | 2/2002 |
| EP | 0 699 368 | | 7/2002 |
| EP | 1300046 | | 4/2003 |
| EP | 1 179 925 A3 | | 8/2003 |
| EP | 1536582 | | 6/2005 |
| GB | 2 367 219 A | | 3/2002 |
| JP | 6-338918 | | 12/1994 |
| JP | 10-200484 | | 7/1998 |
| JP | 11-215480 | | 8/1999 |
| JP | 2000-308023 | | 11/2000 |
| JP | 2001-223716 | | 8/2001 |
| JP | 2002-58002 | | 2/2002 |
| JP | 2002-94567 | | 3/2002 |
| JP | 2002-217965 | | 8/2002 |
| JP | 2003-008487 | | 1/2003 |
| JP | 2003-32316 | | 1/2003 |
| JP | 2003-37649 | | 2/2003 |
| JP | 2003-204342 | | 7/2003 |
| WO | WO 01/39508 | | 5/2001 |
| WO | WO 02/03609 A2 | | 1/2002 |
| WO | WO 02/03609 A3 | | 1/2002 |
| WO | WO 02/087276 A2 | | 10/2002 |
| WO | WO 02/087276 A3 | | 10/2002 |
| WO | WO 02/101513 | | 12/2002 |
| WO | WO 03/003630 | | 1/2003 |
| WO | WO 03/009581 | | 1/2003 |
| WO | WO 03/032643 | | 4/2003 |
| WO | WO 03/075021 | | 9/2003 |
| WO | WO 03/096698 | | 11/2003 |
| WO | WO 2004/062291 | | 7/2004 |

OTHER PUBLICATIONS

Draft Amendment to IEEE Std. 802.11 (1999 Edition), Part 11: MAC and PHY specifications: Medium Access Control (MAC) Quality of Service (QoS) Enhancements, IEEE P802.11e/D8.0, Feb. 2004.

Peter Van Beek, et al., "Adaptive streaming of high-quality video over wireless LANs," Visual communications and Image Processing 2004, Proc. Of SPIE-IS&T Electronics Imaging, SPIE vol. 5308, 2004, pp. 647-660.

Jun Xin et al., "Bit allocation for Joint Transcoding of Multiple MPEG Coded Video Streams," Department of Electrical Engineering, University of Washington, Box 352500, Seattle, WA 98195, 4 pages, Aug. 2001.

Limin Wang and Andre Vincent, "Bit allocation and Contraints for Joint Coding of Multiple Video Programs," IEEE Transactions on Circuits and Systems for video Technology, vol. 9, No. 6, Sep. 1999, pp. 949-959.

Sergio D. Servetto and Klara Nahrstedt, "Broadcast Quality video over IP," IEEE Transactions on Multimedia, vol. 3, No. 1, Mar. 2001, pp. 162-173.

Bernd Girod and Niko Farber, "Chapter 12: Wireless Video," Compressed video Over Networks, Nov. 14, 1999, Telecommunications laboratory, University of Erlangen-Nuremberg, Cauerstrasse 7, 91058 Erlangen, Germany, pp. 1-38.

Amy R. Reibman and Barry G. Haskell, "Constraints on Variable Bit-Rate Video for ATM Networks," IEEE Transactions on circuits and Systems for Video Technology, vol. 2, No. 4, Dec. 1992, pp. 361-372.

Arunchandar Vasan and A. Udaya Shankar, "An Empirical Characterization of Instantaneous Throughput in 802.11b WLANs," Department of computer Science and UMIACS. University of Mayland, college Park, MD 20742, 6 pages, 2002.

Jean-Chrysostome Bolot and Thierry Turletti, "A rate control mechanism for packet video in the Internet," Inria, B. P. 93, 06902 Sophia-Antipolis Cedex, France, 8 pages, 1993.

Vern Paxson, "End-to-End Internet Packet Dynamics," Network Research Group, Lawrence Berkeley National laboratory, University of California, Berkeley, Jun. 23, 1997, 17 pages.

J-C Bolot and T. Turletti, "Experience with Control Mechanisms for Packet Video in the Internet," Inria, 2004, route des Lucioles, 06902 Sophia Antipolis Cedex, France, 12 pages, date unknown.

Daji Qiao, et al., "Goodput Analysis and Link Adaptation for IEEE 802.11a Wireless LANs," IEEE Transactions on Mobile Computing, vol. 1, No. 4, Oct.-Dec. 2002, pp. 278-292.

Steve Gardner, et al., "HomePlug Standard Brings Networking to the Home," CSD Dec. 2000: Feature: HomePlug Standard Brings Networking to the Home, http://www.commsdesign.com/main/2000/12/0012feat5.htm, 9 pages.

Bob O'Hara and Al Petrick, "IEEE 802.11 Handbook: A Designer's Companion," Published by Standards Information Network, IEEE Press, The Institute of Electrical and Electronics Engineers, Inc., 174 pages. Copyright 2001.

Draft "Test Model 5," Test Model Editing Committee, ISO-IEC/JTC1/SC29/WG11/N0400, Coded Representation of Picture and Audio Information, Apr. 1993, Telecommunication Standardization Sector Study Group 15, Experts Group for ATM video Coding.

James C. Chen, Ph.D., Measured Performance of 5-GHz 802.11a Wireless LAN Systems, Aug. 27, 2001, Atheros Communications, Inc., 11 pages.

Kevin Lai and Mary Baker, "Measuring Bandwidth," Jul. 15, 1998, 25 pages, laik@cs.stanford.edu and mgbaker@cs.stanford.edu.

Chi-Yuan Hsu, et al., "Rate Control for Robust Video Transmission over Burst-Error Wireless Channels," IEEE Journal on Selected Areas in Communications, vol. 17, No. 5, May 1999, pp. 1-18.

Philip A. Chou and Zhourong Miao, "Rate-Distortion Optimized Streaming of Packetized Media," Submitted to IEEE Transactions on Multimedia, Feb. 2001, pp. 1-20.

Dmitri Loguinov and Hayder Radha, "Video Receiver Based Real-Time Estimation of channel Capacity," IEEE ICIP 2002, pp. III-213-III-216.

Wendell Smith, "Wireless Video White Paper," ViXS Systems Inc., ViXS Confidential, Jan. 9, 2002, 15 pages.

James F. Kurose and Keith W. Ross, "Computer Networking: A Top-Down Approach Featuring the Internet," Copyright 2001 by Addison Wesley Longman, Inc.

M. Kalman, E. Steinbach, and B. Girod, "Adaptive Media Playout for Low-Delay video Streaming Over Error-Prone Channels," IEEE Transactions on Circuits and Systems for Video Technology, vol. 14, No. 6, Jun. 2004, pp. 841-851.

R. Ramjee, J. Kurose, D. Towsley, and H. Schulzrinne, "Adaptive Playout Mechanisms for Packetized Audio Applications in Wide-Area Networks," IEEE Infocom, Toronto, Canada, Jun. 1994, 9 pages.

M. Kalman, E. Steinbach, and B. Girod, "Adaptive Playout for Real-Time Media Streaming," Proc. IEEE International Symposium on Circuits and Systems, ISCAS-2002, Scottsdale, AZ, May 2002, 4 pages.

International Search Report for PCT/US 06/36433 mailed Apr. 27, 2007.

M. Kalman, B. Giron and P. Van Beek, "Optimized transcoding rate selection and packet scheduling for transmitting multiple video streams over a shared channel," IEEE Int. Conference on Image Processing (ICIP 2005), Genova, Italy, Sep. 2005, 4 pages.

K. Stuhlmuller, N. Farber, M. Link and B. Girod, "Analysis of video transmission over lossy channels," IEEE Journal on Selected Areas in Communications, vol. 18, No. 6, Jun. 2000, pp. 1012-1032.

S. Aramvith, I-M. Pao and M.-T. Sun, "A rate control scheme for video transport over wireless channels," IEEE Trans. On Circuits and Systems for Video Technology, vol. 11, No. 5, May 2001.

* cited by examiner

Delay constraints in case of streaming pre-encoded audio/video data

Reducing playout rate at the receiver (adaptive media playout)

Media transmission system with audio/video storage and transcoder at sender

FIG. 7

Accelerated media coding: Increasing number of AV data units transcoded and transmitted per second at the sender while decreasing the bit rate of the AV stream

ACCELERATED MEDIA CODING FOR ROBUST LOW-DELAY VIDEO STREAMING OVER TIME-VARYING AND BANDWIDTH LIMITED CHANNELS

BACKGROUND OF THE INVENTION

Effective transmission of compressed audio/video stream as a sequence of audio/video (AV) data units.

The effective transmission of high-quality and robust audio/video (AV) streams from a source device to one or more receiving devices over a network is desirable. Such a network may include, for example, interconnections based on wired (for example Ethernet), wireless (for example IEEE 802.11 wireless), or power-line (for example HomePlug) links. For example, the source device may be a home server; the receiver may be a television set; and the network may be a local area network. The AV stream may be the transmission of stored audio and video streams (streaming). The AV stream may also be the transmission of live audio and video, and may include some level of interaction, such as channel changing. It is also desirable to have the maximum end-to-end delay limited from less than one second to a few seconds.

The available bandwidth of wireless networks (such as those based on IEEE 802.11) and other types of home networks may be limited, may vary over time and may be unpredictable due to various reasons. Transmission of compressed AV streams over such networks is difficult because high-quality AV streams require a relatively continuous bandwidth and due to the stringent delay constraints on delivery of AV data. Degradations of network conditions may result in losses and delays of packets carrying AV data. Delayed packets arriving at the receiver after their delivery deadline has passed may also be considered lost. AV data that is lost or arrives late at the receiver may also lead to unacceptable distortions in the rendered output or interruptions of the rendering.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Feedback-based systems exist in audio/video transmission system for robust streaming of AV over home networks. The available network bandwidth may be measured and monitored on-line (during transmission of AV data). The result of such measurement is fed back to a system that dynamically adapts the bit rate of compressed AV streams to the changing network bandwidth. The compressed AV stream is generated or adapted by an encoder or transcoder.

Reducing the playout delay is desirable in systems for streaming compressed audio/video data over packet networks. Playout delay is also referred to as startup delay or startup latency. It is experienced by users of streaming media systems as a delay in the response to a request for playing an AV media stream, for example when starting a new stream or when switching between streams. For example, in media streaming over the Internet, a user who requested to play audio/video content may have to wait a number of seconds (such as 5 or 10 seconds) before the content is rendered. However, users of TV receivers are accustomed to an immediate response to requests such as changing a channel. Therefore, an improvement to this is desirable for systems that stream high-quality audio/video media over home networks to high-quality displays that also function as broadcast TV receivers.

For example, an AV data unit may correspond to a single video frame out of the series of video frames constituting a video stream. Alternatively, an AV data unit may, for example, correspond to a portion of a single video, or to a group of video frames. For clarity of presentation, one may often refer to AV data units and video frames interchangeably. It is to be understood that the technology is not limited to the case of video streams, and also applies to, for example, audio streams. Furthermore, video usually may imply that the associated audio is included.

For continuous AV streams, each AV data unit should be delivered to the receiver before its delivery deadline in order to avoid distortions or interruptions of the decoding and rendering of the AV stream at the receiver. Therefore, each AV data unit has an associated delivery deadline, corresponding to the time at the receiver that the AV data unit must be available for decoding and subsequent rendering. The process of decoding and rendering may also be referred to as playout.

Systems for audio/video transmission over packet networks (such as streaming media systems) typically utilize a buffer at the receiver. This buffer may be referred to as a decoder buffer or receiver buffer. Packets with AV data that are received from the network are stored temporarily in this decoder buffer before being fed into the AV decoder. This buffer is included to absorb variations in the delay with which AV data packets are transported across the network (delay jitter) as well as for other reasons. This buffer reduces the probability of decoder buffer underflow—events where AV data units arrive late at the receiver (i.e. after their respective delivery deadlines) due to variations in delay. Such events result in distortions or interruptions of the rendering of the AV stream at the receiver.

Figure 1:
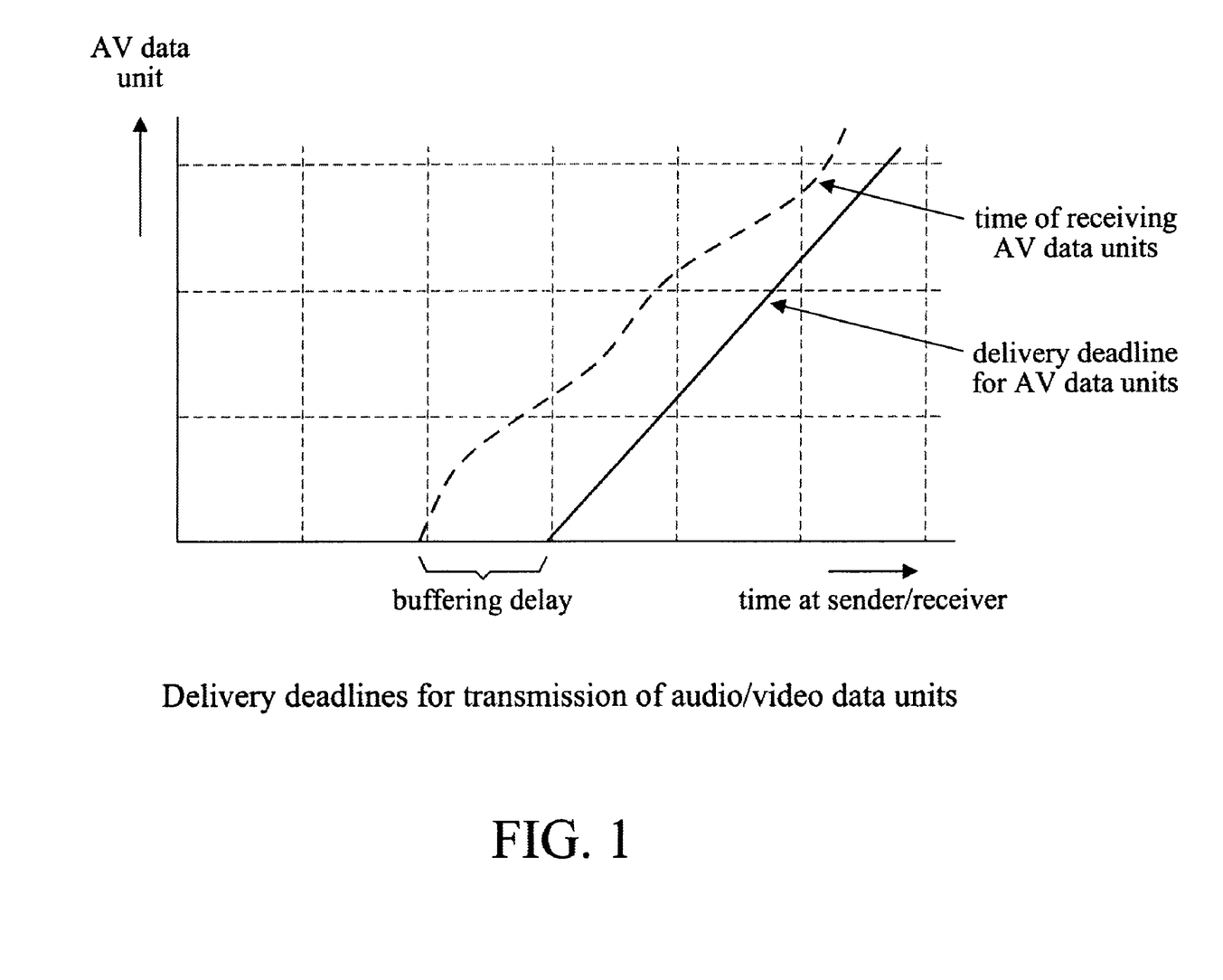
FIG. 1 is a graphical representation of delivery deadlines for transmission of audio/video data units.

Referring to FIG. 1, the horizontal axis corresponds to the time at the sender or receiver (for illustration purposes, this image assumes that the sender and receiver clocks run at the same rate). The vertical axis corresponds to the progression of AV data units through the AV stream. For example, a point on this axis near the origin may correspond to the first video frame in a video stream, while points higher up on this axis may correspond to video frames with higher frame numbers, or later time stamps. The vertical axis can also be viewed as the internal AV clock or encoder clock. Units on the vertical axis may be in frame numbers, or in seconds. The diagram shows the delivery deadline for AV data units in a solid curve, where for each point on this curve, its location on the vertical axis indicates the sequence number or time stamp of the AV data unit, and its location on the horizontal axis indicates the associated delivery deadline. The slope of the delivery deadline curve corresponds to the playout rate, for example the number of video frames per second rendered at the receiver—normally the video frame rate. Playout rate may also be referred to as playout speed. The diagram also shows the time that AV data units actually arrive at the receiver, in a dashed curve. The duration of time that a particular AV data unit is buffered in the receiver decoder buffer before playout corresponds to the horizontal interval between the dashed curve indicating the time of arrival and the solid curve indicating the delivery deadline of that data unit. Indicated as well is the (decoder) buffering delay, which is the time that the first AV data unit is buffered in the receiver. This corresponds to the time that the receiver waits, after receiving the first AV data unit, before proceeding to decode and render this first data unit.

It can be seen from FIG. 1 that increasing the amount of data that is buffered at the receiver for a given transmission channel reduces the probability of buffer underflow, i.e., it increases the robustness of the system. However, it also increases the buffering delay, which can be a significant portion of the overall delay or latency that a user of an audio/video transmission system experiences when starting an audio/video stream before it is actually rendered. This overall delay is referred to as playout delay, and may also be referred to as startup delay, preroll delay, or just latency. It is typically undesirable to users, and it may be experienced whenever the user interacts with the system, including for example starting a new stream, switching from one stream to another stream, changing channels, pausing a stream. Therefore, in practical systems, a balance is desirable between increasing playout robustness and user tolerance for delay.

Figure 2:
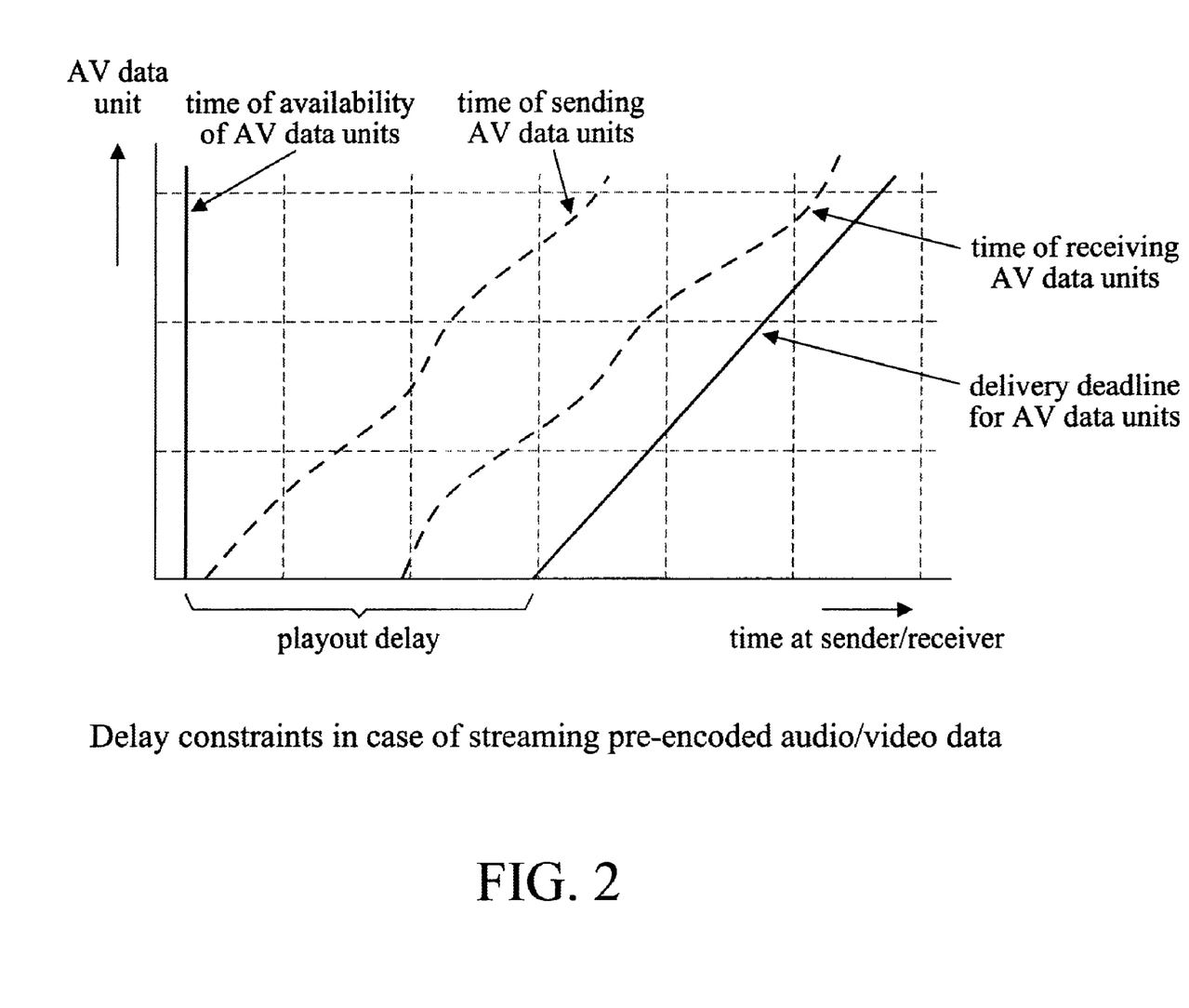
FIG. 2 is a graphical representation of delay constraints in case of streaming pre-encoded audio/video data.
Figure 3:
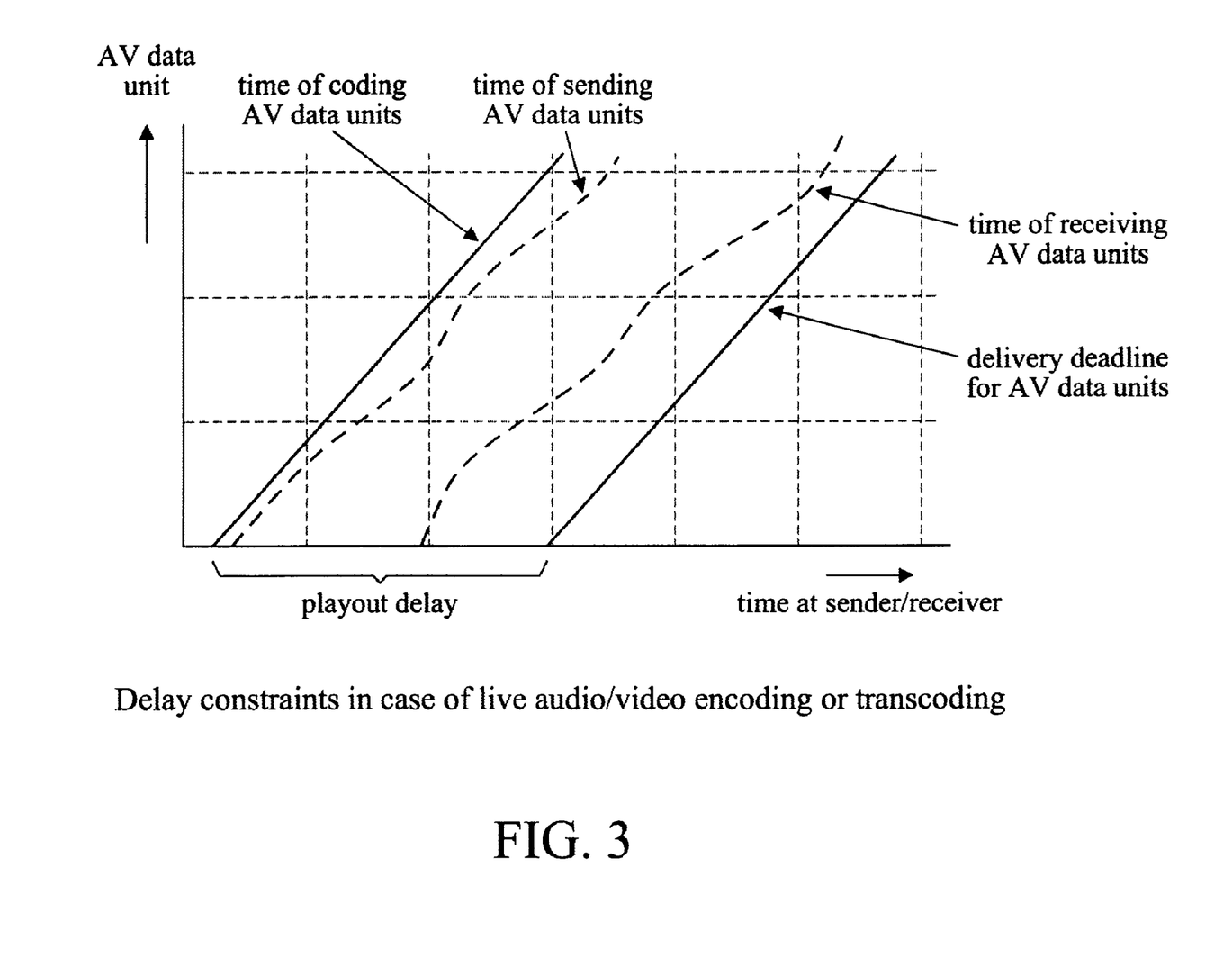
FIG. 3 is a graphical representation of the delay constraints in case of live audio/video encoding or transcoding.

In practical applications, two important scenarios exist: streaming of pre-encoded audio/video data, illustrated in FIG. 2, and live audio/video encoding (or transcoding), illustrated in FIG. 3.

In the first scenario of FIG. 2, all pre-encoded audio/video data is available for transmission at the start of the session. The audio/video data is stored at a server, for example in the home this could be a PC, or a personal video recorder (PVR), or digital video recorder (DVR). The time of availability of AV data units for transmission is indicated in the diagram in FIG. 2 with a solid curve on the left. It is a straight vertical line, since all AV data units are substantially available at the start of the session. The time that AV data units are sent into the channel (network) is indicated in this diagram using a dashed curve. The slope of this curve approximately corresponds to the sending rate, the number of AV data units (for example video frames) sent or transmitted per second. Given the amount of bits used to encode AV data units, this results in an overall transmission bit rate. In channels with limited bandwidth, the transmission bit rate should not exceed the bandwidth or maximum throughput. Typically, the sending rate is approximately equal to the playout rate. The delay between the time at the start of the session to the time that the first AV data unit is played out is the playout delay, also indicated in the diagram. The horizontal interval between the first solid curve (on the left) indicating the time of availability of AV data units at the sender and the second solid curve (on the right) indicating the delivery deadline for AV data units at the receiver is referred to as the end-to-end delay. In this scenario, it is different for different data units.

In the second scenario (live audio/video coding) of FIG. 3, new audio/video data becomes available on a real-time basis, progressing through the session. The start of a session may, for example, correspond to tuning in to an audio/video stream being broadcast. The time that AV data units are encoded at the sender before transmission in this scenario is indicated in the diagram in FIG. 3 with a solid curve on the left. For the sake of simplicity, the time of availability of AV data units at the sender may be considered the same as the time the data units are encoded. The slope of this curve approximately corresponds to the encoding rate (not generally encoding bit rate), which in this scenario is equal to the playout rate. For example, in real-time video coding this normally corresponds to the video frame rate. The time that AV data units are sent into the channel (network) by the sender is again indicated in FIG. 3 using a dashed curve.

For many reasons, the AV data that is encoded is typically buffered temporarily at the sender before transmission, in an encoder buffer. This buffer may also be referred to as a transmission buffer. The duration of time that a particular AV data unit is buffered in the sender encoder buffer corresponds to the horizontal interval between the first solid curve (on the left) indicating the time of encoding of AV data units and the dashed curve (on the left) indicating the time that data units are actually sent. Again, the horizontal interval between the first solid curve (on the left) indicating the time of encoding of AV data units at the sender and the second solid curve (on the right) indicating the delivery deadline for AV data units at the receiver is referred to as the end-to-end delay. In this scenario, it is substantially the same for all data units. The delay between the time at the start of the session to the time that the first AV data unit is played out is the playout delay, again also indicated in the diagram.

Note that in both scenarios (FIG. 2 and FIG. 3) the (decoder) buffering delay is a significant portion of the overall playout delay. The conventional method to increase playout robustness is to increase playout delay, for example by increasing the amount of data that is buffered at the decoder. However, this comes at the cost of decreased user satisfaction due to the delay in the system response to user requests.

A first technique for reducing playout delay without significantly decreasing playout robustness is generally referred to here as "adaptive media playout." In adaptive media playout, the playout rate at the receiver is adapted to the fullness of the decoder buffer. In particular, playout rate may be reduced temporarily, such that the rate at which AV data units are retrieved from the decoder buffer for decoding and rendering is lower than the rate at which AV data units enter the decoder buffer. For example, a smaller number of frames are rendered per second than the normal frame rate. This results in effectively building up (growing) the number of data units (for example video frames) in the decoder buffer over a period of time. This allows one to decrease the playout delay, by starting to decode and render AV data sooner than normal, albeit at a playout rate that is slower than the usual, nominal, rate. Furthermore, after a period of time, one would achieve a steady state with a sufficient amount of data in the decoder buffer that corresponds to a desired playout robustness. At that point, playout at the nominal rate, for example the normal frame rate, would start or resume.

Figure 4:
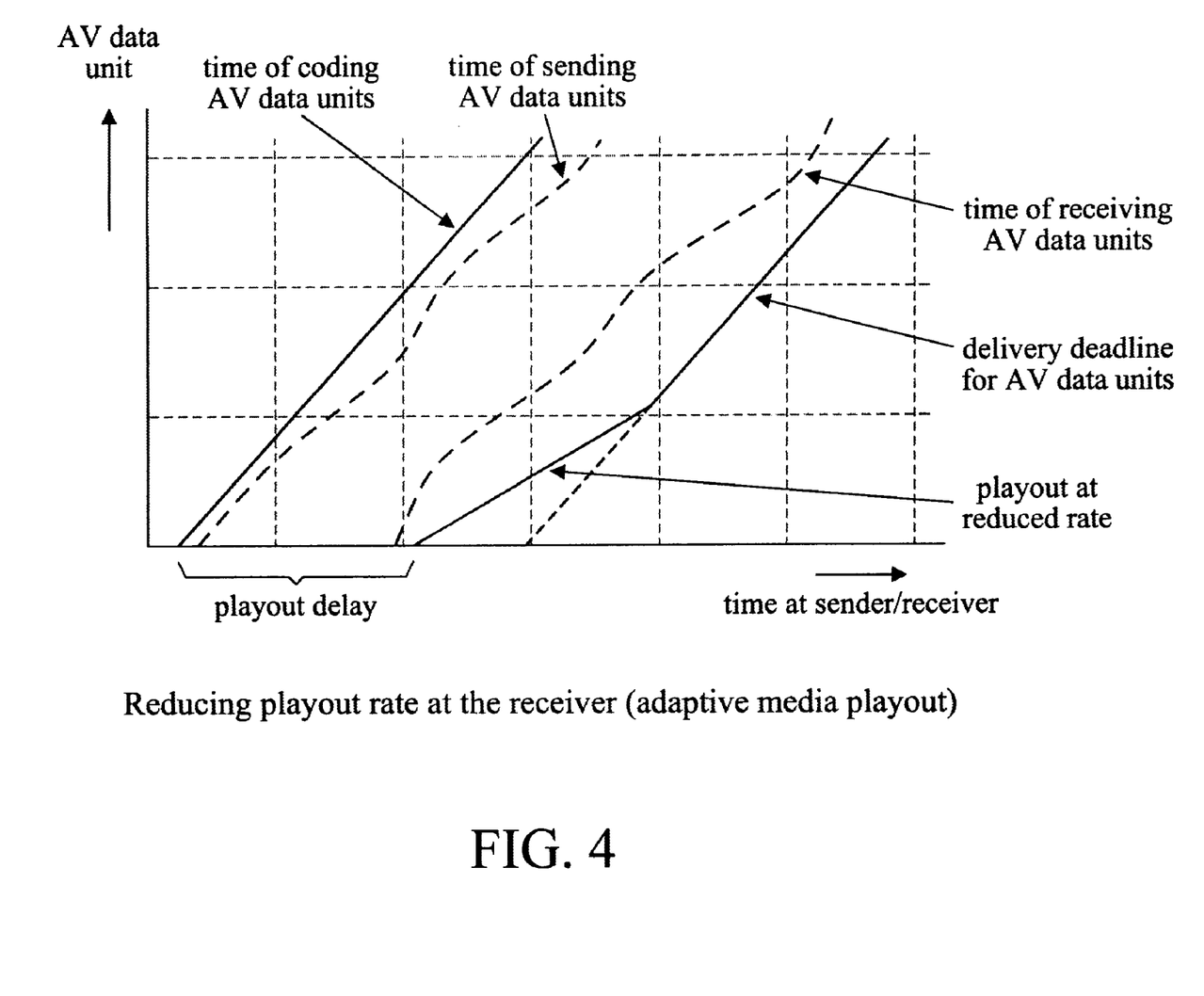
FIG. 4 is a graphical representation of the reduction of the playout rate at the receiver.

The principle of reducing the AV playout rate at the receiver to reduce playout delay is illustrated in the diagram in FIG. 4. The principle is shown in the context of the live audio/video coding scenario—compare FIG. 3. Note that the playout rate can be reduced, while at the same time the same robustness to variations in transmission delay is achieved after the startup phase. The end-to-end delay is effectively increased over time, starting from a smaller value, and up to, in this example, the same value it was without the use of the adaptive media playout technique.

This technique can be applied in both the streaming pre-encoded audio/video data and live audio/video coding scenarios.

This technique can also be used during the start-up phase, as well as at any time when the decoder buffer fullness decreases substantially, for example, due to degrading channel conditions.

Unfortunately, this technique suffers from a few disadvantages. One disadvantage is that the effect of a reduced playout rate may be visible to a user—the reduction should be small to remain unobtrusive. Another disadvantage is that to achieve the effect of reduced playout at the receiver, special processing of the audio and video is needed, which increases the cost of the receiver device. For example, repetition of video frames or interpolation of video frames may be necessary, and processing of the audio data is necessary to achieve a slowdown without altering the sound pitch.

Another method for reducing playout delay without significantly decreasing playout robustness is referred to here as "stream acceleration." In stream acceleration, the number of transmitted frames per second is increased at the sender (for example, a server) during periods when the amount of data in the decoder buffer is small. In particular, the number of transmitted frames per second may be increased temporarily, such that the rate at which AV data units enters the decoder buffer is higher than the rate at which AV data units are retrieved from the decoder buffer for decoding and rendering. This results in effectively building up (growing) the number of AV data units in the decoder buffer over a period of time. This allows one to decrease the playout delay, because initially the AV data arrives at the decoder buffer sooner than normal. After a certain period of time, one would achieve a steady state with a sufficient amount of data in the decoder buffer that corresponds to a desired playout robustness. At that point, the sender would start transmitting the normal number of AV data units (video frames) per second into the channel. Note that this method by itself does not necessarily involve varying the bit rate of the AV data.

Figure 5:
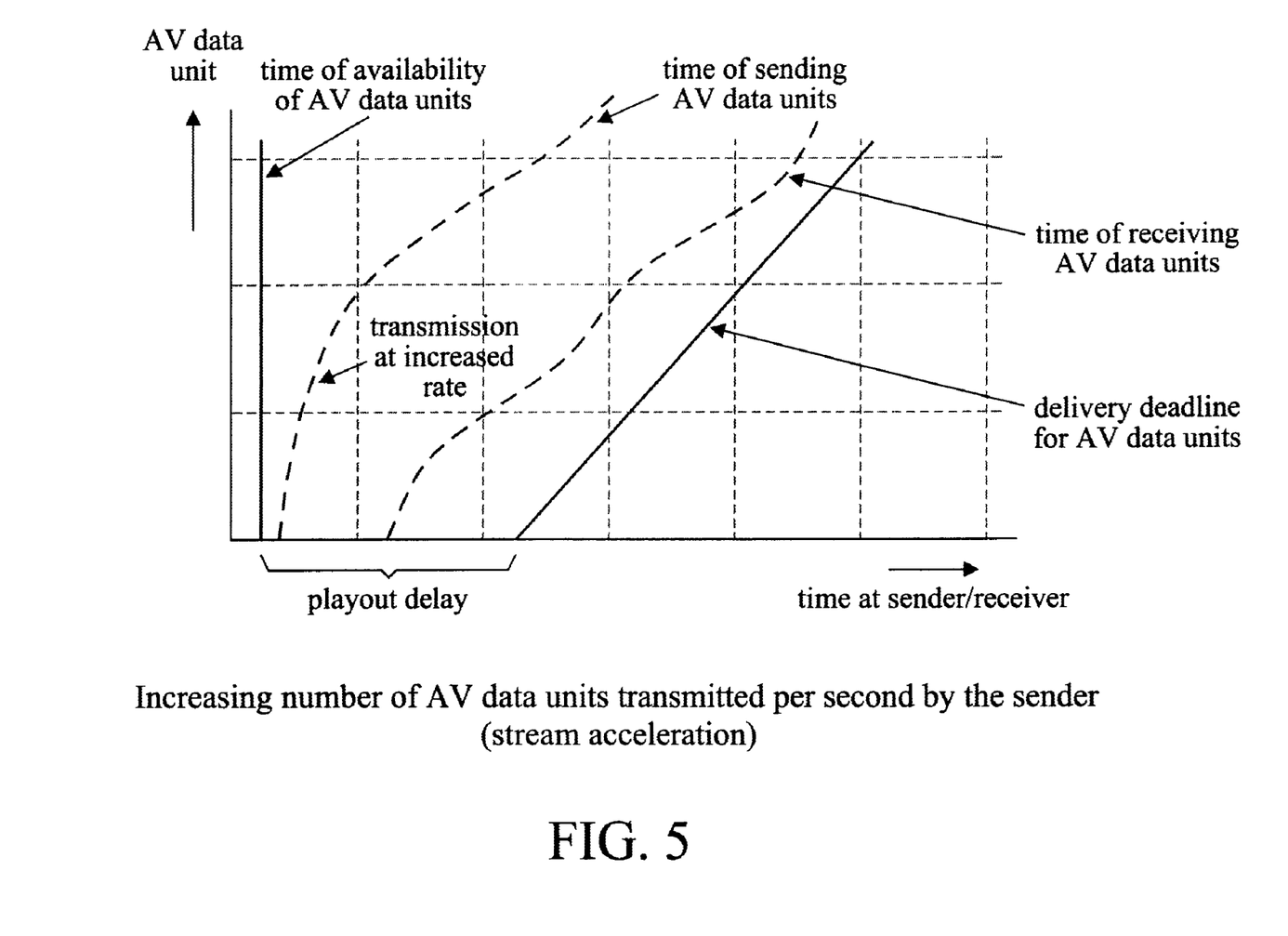
FIG. 5 is a graphical representation of increasing the number of AV data units transmitted per second by the sender.

The principle of increasing the rate of transmitting video frames at the sender to reduce playout delay is illustrated in the diagram in FIG. 5. The principle is shown in the context of the streaming of pre-encoded audio/video scenario—compare FIG. 2. Note that the playout delay can be reduced, while at the same time the same robustness to variations in transmission delay is achieved after the startup phase.

This technique can only be applied in the case of streaming pre-encoded audio/video data (not in the live coding scenario). This technique can also be used during a startup phase when a new stream is requested, as well as at any time when the decoder buffer fullness decreases substantially, for example, due to degrading channel conditions.

This technique suffers from a few disadvantages. The main disadvantage of this technique is an inefficient use of network resources, in particular available bandwidth. Increasing the number of transmitted AV data units per second that were pre-encoded at a fixed bit rate increases the overall bit rate necessary for transmission. That is, it requires a larger channel bandwidth than would normally be necessary. In some cases such extra bandwidth may not be available. In the other cases where such extra bandwidth is available, this implies that on the average there is extra bandwidth available which could otherwise be used to transmit AV data with a higher bit rate, i.e., at a higher quality. For example, a simple example may be transmission of a video stream that is pre-encoded at 30 frames per second and at a bit rate of 2 Mbps over a channel with a fixed bandwidth of 3 Mbps. This channel allows the use of the stream acceleration technique at the startup of the stream, up to a speedup factor of 1.5×, for a certain period of time. This would result in transmitting 45 frames per second during that period, and would result in a transmission bit rate of 3 Mbps. In this example, transmission at the nominal (1×) frame rate is resumed once the decoder buffer achieves a desired fullness. At that point a 2 Mbps stream is transported over a 3 Mbps channel, at 30 frames per second. This implies that in the steady state, which is most of the time, a video stream with a higher average bit rate and higher quality could have been transmitted through this channel. Therefore, to alleviate the main disadvantage of the stream acceleration technique, some form of adaptability of the AV data stream is desirable.

Other techniques exist that alleviate this main disadvantage of stream acceleration to some extent. One such technique relies on the use of scalable audio/video coding, also called layered coding. Scalable coding provides a means for adapting the bit rate of the AV data stream and can be combined with stream acceleration. However, in most cases, scalable or layered audio/video coding comes at the cost of reduced coding efficiency, or reduced quality, compared to conventional audio/video coding Another technique to provide adaptability of the AV data stream bit rate is to use two (or more) encoders, each encoding at a different bit rate. This technique may be used in specific limited scenarios where live encoding is necessary. It requires availability and encoding of AV data from all channels available to a user simultaneously, in parallel. This technique also suffers in that only a limited amount of rate adaptability is available, and that usually the encoding bit rates are fixed. This precludes adaptation of the rate to the channel conditions in real time.

A suitable technique for reducing playout delay includes the use of an audio/video transcoder to provide rate adaptability. This is combined with stream acceleration and may be extended further such that the AV data is both transcoded and transmitted at an increased number of frames per second. Furthermore, the bit rate of the AV stream may also be adapted dynamically to time-varying channel conditions. One may refer to this technique as "accelerated media coding" (AMC).

This technique can be readily utilized in a scenario that is a hybrid between the pre-encoded audio/video scenario and the live audio/video coding scenario. In this scenario, pre-encoded audio/video data is assumed to be substantially available at the start of a session. However, the audio/video data is transcoded "live" to allow adaptation of the stream to current system and channel conditions.

Figure 6:
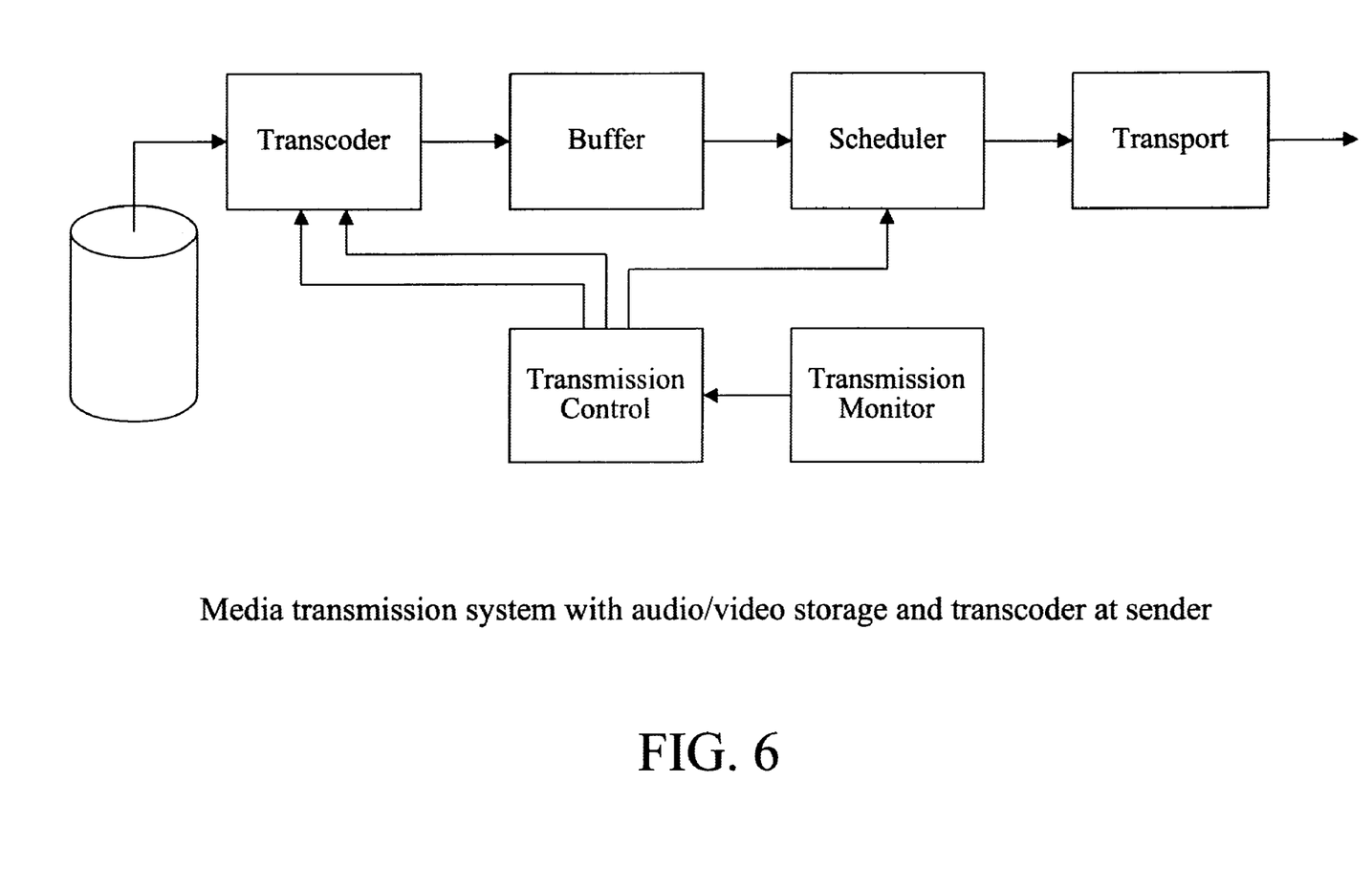
FIG. 6 is a diagram showing the media transmission system with audio/video storage and transcoder at sender.

A system diagram of the sender part of the AV transmission system is shown in FIG. 6. A pre-encoded audio/video stream is available on a storage medium (on the left), for example a hard-disk, a DVD, or other. The encoded audio/video data is read from the storage medium, and adapted by a transcoder. Adaptation of the audio/video data stream may involve adjusting the bit rate to current system and channel conditions. Transcoding may also involve modifying the compression format, for example, from MPEG-2 to MPEG-4. Transcoding may also involve modifying the spatial and temporal resolution of the AV stream. After transcoding, coded audio/video data is buffered in an encoder/transcoder buffer. Subsequently, a scheduler retrieves coded audio/video data and submits data units to the transport module. The scheduler module determines the rate at which data units are submitted for transport across the channel or network. The transport module illustrates further processing such as packetization of AV data units, possibly other processing by various protocol layer entities, as well as for example a wireless transmitter.

The diagram in FIG. 6 also illustrates a transmission monitoring module. This module may receive inputs from various sources that relate to the status of the system and the channel. For example, one input may be the encoder buffer fullness, and another input may be the decoder buffer fullness. Another input may be an estimate of available bandwidth. Alternatively, this module may receive inputs that allow it to compute an estimate of available bandwidth itself, as well as estimates of the fullness of the various buffers. Parameters describing the system and channel status are provided to the transmission control module. The transmission control module controls the scheduler to transmit an appropriate number of AV data units (video frames) per second, and controls the transcoder to transcode an appropriate number of AV data units (video frames) per second, and controls the transcoder to adapt its output bit rate appropriately.

Figure 7:
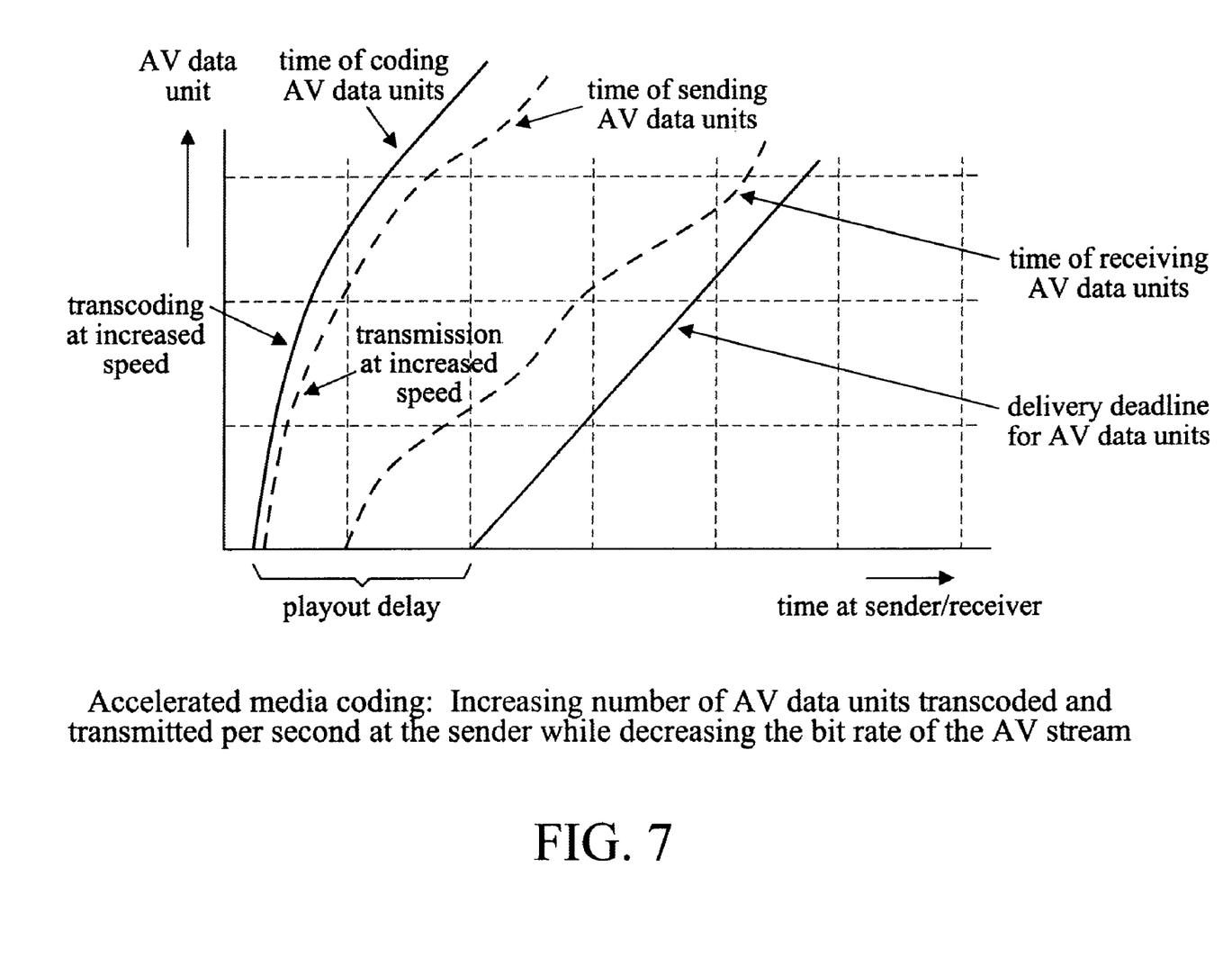
FIG. 7 is a graphical representation of accelerated media coding.

The preferred technique for accelerated media coding is illustrated in the diagram in FIG. 7. Accelerated media coding is characterized by "simultaneously":

increasing the number of AV data units (for example video frames) transmitted per second; and/or increasing the number of AV data units (for example video frames) transcoded per second; and/or adapting the bit rate of the AV stream (for example video stream) using the transcoder.

Comparing FIG. 7 with FIG. 3 and FIG. 5, FIG. 7 illustrates the use of accelerated media coding to reduce playout delay. As in the stream acceleration technique, AMC involves increasing the number of frames transmitted per second. Note the difference between transmission bit rate and number of video frames (AV data units) per second. The number of transmitted video frames per second is controlled by the scheduler module in FIG. 6. Transcoding of the bit stream is utilized in AMC, also at an increased number of frames per second. For example, video frames are retrieved from the storage medium and subsequently transcoded faster than the normal frame rate. Transcoding and transmitting an increased number of video frames per second is utilized for a certain period of time, after which transcoding and transmission at the normal (nominal) frame rate is started (or resumed). Note that the playout delay again can be reduced, while at the same time the same robustness to variations in transmission delay is achieved after the startup phase as would normally be the case without AMC. During the startup phase, the bit rate of the AV stream is adapted as well. For example, in case the available bandwidth of the channel or network is limited, the initial AV bit rate is controlled such that the resulting transmission bit rate—the result of the AV bit rate and increased number of transmitted frames per second—substantially fits within the available bandwidth. After the startup phase, when the number of transmitted frames per second returns to its nominal value, the AV bit rate may be increased, and controlled to match the full available bandwidth. This is unlike the case of stream acceleration. In the preferred system the bit rate of the AV stream is always near the optimal level; therefore, the AV quality is near the highest possible level. Using this technique, a reduction in playout delay can be achieved, while also decreasing the probability of buffer underflow at the receiver over time, until a desired level has been reached.

Note again that the horizontal interval between the first solid curve (on the left) indicating the time of transcoding of AV data units at the sender and the second solid curve (on the right) indicating the delivery deadline for AV data units at the receiver is the end-to-end delay. In this scenario, it is different for different data units—in particular, it increases during the startup phase. During the normal playout phase (after the startup phase), the end-to-end delay remains constant, until accelerated media coding is applied again at a later time.

To return to the example used above, consider a channel with a fixed bandwidth of 3 Mbps, and consider that a video stream is available on a storage medium at the sender, encoded with a high quality at an average bit rate of 4 Mbps and at 30 frames per second. To achieve the same 1.5× increase in the number of transmitted frames per second during the startup phase, the transcoder may reduce the bit rate to 2 Mbps, so that the overall transmission bit rate (1.5×2 Mbps) fits into the channel bandwidth. After a period of time, the system determines that the number of transcoded and transmitted frames per second can be returned to its nominal value of 30 (1×). At this point, the system may also increase the bit rate of the video stream at the output of the transcoder, for example to 3 Mbps (or slightly lower if some headroom is needed). From this point on, the system with accelerated media coding is able to deliver video data to the receiver at a higher quality than was possible with a system using stream acceleration only.

Accelerated media coding has been described here mostly in the context of the startup phase when starting a new stream. However, it is also applicable when switching from one stream to another stream (channel changing), or when pausing, etc. Accelerated media coding can be used during the stream startup phase, as well as at any other time that it is determined to be necessary, for example, due to degrading channel conditions. In fact, accelerated media coding can be used to dynamically respond to variations of the channel conditions at any point during a session. The bit rate of the AV stream can be controlled using the transcoder to achieve an optimal level depending on current conditions. The above example used a fixed channel bandwidth for simplicity. It is to be understood that the accelerated media coding technique offers similar advantages in the case where the channel bandwidth varies over time. The system with accelerated media coding is capable of handling a time varying channel bandwidth or throughput as well.

Compared to the adaptive media playout technique, accelerated media coding allows the use of a conventional receiver without special provisions to achieve the reduction of playout delay. This reduces the cost of the receiver. The receiver may be essentially unchanged from a standard receiver.

Compared to the stream acceleration technique, accelerated media coding provides better video quality to the user. This method improves the video quality by adapting the transcoder output bit rate dynamically.

Furthermore, accelerated media coding can be seen as a method of applying stream acceleration without the need for extra bandwidth during the startup phase. Therefore, more efficient use of the overall network resources, in particular bandwidth, can be achieved. Furthermore, the use of bit rate adaptation during accelerated media coding allows the system to take into consideration limitations of other resources, such as the decoding buffer.

The following describes methods to control and adapt the bit rate of the audio/video stream and methods to control the number of AV data units (video frames) transcoded and transmitted per second. An AV stream has a nominal rate at which AV data units are intended to be rendered. For example, a video stream has a nominal frame rate at which video frames are intended to be presented. One may denote this nominal rate by $f_N$. This may be equal to the number of AV data units normally trans(coded), transmitted, and decoded per second. More generally, each AV data unit has a nominal duration for which it is intended to be rendered. Without limitation, one may assume in the following that the nominal duration is a constant, denoted by $t_N$. For example, each video frame in a constant frame rate video stream is presented for a certain duration.

One method to control the number of AV data units transcoded and transmitted per second is to adapt this number relative to the nominal (frame) rate of the AV stream. This can be described with scaling functions: a first transcoding scaling function $z_C$ applied to the number of frames transcoded per second, and a second transmission scaling function $z_S$ applied to the number of frames transmitted per second. The effective number of frames transcoded per second $f_C$ is the product of the nominal frame rate $f_N$ and the first scaling function $z_C$:

$$f_C = z_C \cdot f_N$$

The effective number of frames transmitted per second $f_S$ is the product of the nominal frame rate $f_N$ and the second scaling function $z_S$:

$$f_S = z_S \cdot f_N$$

Typically, both scaling functions $z_C$ and $z_S$ are greater than 1.0 during a stream startup phase when applying accelerated media coding. This means that AV data units are transcoded and transmitted at an increased number per second—faster than nominal frame rate. In a basic mode of operation, the increase in the number of frames transcoded per second is substantially equal to the increase in the number of frames transmitted per second. In this mode, the transcoding scaling function is substantially equal to the transmission scaling function:

$$z_C \approx z_S$$

In certain cases, it may also be useful to effect a slowdown of transcoding and transmission. This means that fewer AV data units may be transcoded and transmitted per second than normal—at lower than nominal rate. In these cases, both $z_C$ and $z_S$ are smaller than 1.0. This may be useful to avoid overflow of the decoder buffer during the streaming session.

To achieve accelerated media coding, the transcoding and transmission scaling functions may be applied for a fixed period of time. Also, the transcoding and transmission scaling functions may be applied for a variable period of time, for example until a desirable system status is received. For example, the sender may be informed by the receiver that the decoder buffer has reached a desired fullness. The transcoding and transmission scaling functions typically change their value between the time of the startup of a stream and the time that the startup phase has ended. The transcoding and transmission scaling functions may be constant during the period of time that accelerated media coding is applied. Then, at the end of the startup phase, their values may be set to 1.0. The transcoding and transmission scaling functions may vary over time during the period of time that accelerated media coding is applied. For example, the scaling functions may gradually decrease from an initial value greater than 1.0 to the value 1.0 at the end of the startup phase. The transcoding and transmission scaling functions may depend on encoder buffer fullness. The scaling functions may depend on the number of AV data units in the encoder buffer. The transcoding and transmission scaling functions may depend on decoder buffer fullness. The scaling functions may depend on the number of AV data units in the decoder buffer. The transcoding and transmission scaling functions may depend on the difference between the arrival time of AV data units at the receiver and their delivery deadline time.

The transcoding and transmission scaling functions may be substantially controlled by the sender. The transcoding and transmission scaling functions may be substantially controlled by the receiver. The transcoding and transmission scaling functions may be jointly controlled by both the sender and the receiver.

In an advanced mode of operation, the transcoder scaling function may be different from the transmission scaling function. For example, the transmission scaling function may be temporarily higher than the transcoding scaling function. This mode of operation is enabled by the presence of the buffer between the transcoder and scheduler, as shown in FIG. 6.

One method to control the bit rate of the audio/video stream at the output of the transcoder is to adapt it relative to the bit rate of the audio/video media stream at the input of the transcoder. This method assumes that the available bandwidth of the channel or network is sufficient relative to the bit rate of the original AV stream, in the normal case where accelerated media coding is not applied. This can be described with a bit rate scaling function $z_B$ applied to the bit rate of the AV stream. The target bit rate at the transcoder output is the product of the bit rate at the transcoder input and the bit rate scaling function:

$$R_{out} = z_B \cdot R_{in}$$

The AV bit rate scaling function may depend on the transcoding and transmission scaling functions. For example, the AV bit rate scaling function may be the inverse of the transmission scaling function:

$$z_B = 1/z_S$$

The scaling functions typically change their value between the time of the startup of a stream and the time that the startup phase has ended. Typically, the bit rate scaling function $z_B$ is smaller than 1.0 during a stream startup phase when applying accelerated media coding. Therefore, the bit rate of the coded bit stream is typically reduced during the startup phase.

In another method to control the bit rate of the audio/video stream at the output of the transcoder, estimates of available bandwidth or throughput H of the channel or network may be taken into consideration. As an example, the bit rate of the audio/video may be set at the beginning of the stream startup phase based on a single value of the bandwidth or throughput in the case that the latter is presumed constant. Alternatively, the bit rate of the audio/video may be updated continuously as new estimates of the bandwidth or throughput become available. Therefore, any limitations and variations of the channel bandwidth are taken into account. For example, the target bit rate at the output of the transcoder may be adapted such that the effective transmission bit rate resulting from the product of the AV stream bit rate and the transmission scaling function is substantially less or equal to the available bandwidth or throughput:

$$R_{out} \cdot z_S \leq H$$

This is equivalent to choosing a bit rate scaling function that depends on the input bit rate, the available bandwidth, and the transmission scaling function, as follows:

$$z_B \leq H/(z_S \cdot R_{in})$$

The bit rate scaling function may be constant during the period of time that accelerated media coding is applied. For example, the bit rate scaling function may be constant for all video frames of a video stream during the startup phase.

The bit rate scaling function may vary during the period of time that accelerated media coding is applied. For example, the bit rate scaling function may gradually increase from an initial value smaller than 1.0 to the value 1.0 at the end of the startup phase. The bit rate scaling function may also increase to a value that is commensurate with the available bandwidth.

The bit rate scaling function may depend on characteristics of the AV data stream. For example, the bit rate scaling function may depend on the coding type of video frames (I-, P- or B-type) from a video stream.

Another method to control the bit rate of the audio/video stream at the output of the transcoder is to use the method of delay-constrained rate adaptation. This method involves determining a constraint on the end-to-end delay. Recall the illustration of the end-to-end delay in the case of accelerated media coding from FIG. 7, and how it varies in this scenario. This variability can be easily taken into account in the rate adaptation framework by once a delay constraint has been determined, the bit rate of the AV stream is adapted such that AV data units substantially arrive on time, even in the case where the number of AV data units transcoded and transmitted per second has been increased. Delay-constrained rate adaptation may take into account the expected delays of AV data units during transmission, or may take into account the expected available bandwidth for transmission of AV data units. Therefore, limitations and variations of the channel bandwidth are inherently taken into account. Delay-constrained rate adaptation may also take into account the system status, such as fullness of the various buffers in the system, for example an encoder buffer, a decoder buffer, or a MAC buffer.

It is also to be understood that a similar system may be employed with pre-transcoded video streams. By way of example, the bit rate of the initial frames may be decreased. And the bit rate of later frames may be increased (or vice versa). Thus the transmitter may send the frames at a higher initial frame rate and then at a lower frame rate. In this manner, the initial frames may be transmitted at a higher frame rate while decreasing the need for additional bandwidth, and the later frames may be transmitted at a lower frame rate using a similar amount of bandwidth so as to increase image quality.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A system for transmitting a data stream including at least one of audio and video over a transmission channel to a receiver at a bit rate capable of being varied, said data stream arranged in frames, said system comprising:
   (a) a transcoder that receives said data stream and transcodes said data stream at a first average number of frames per second for a first period of time and at a second average number of frames per second for a second period of time, where said first period of time is immediately prior to said second period of time, where said first average number of frames per second is greater than said second average number of frames per second, where said first average number of frames per second is greater than a playback rate of frames per second at said receiver and said second average number of frames per second is no greater than a playback rate of frames per second at said receiver, and where the transition between said first period of time and second period of time is based on a measure of the fullness of a buffer at said receiver;
   (b) a transmitter that transmits the transcoded data stream at an average bit rate for a third period of time that is different than an average bit rate over a fourth period of time, where said first period of time is overlapping in time with said third period of time, where said second period of time is overlapping in time with said fourth period of time;
   (c) a controller that optimizes the bit rate at which said transcoder transcodes said data stream based on an estimate of transmission characteristics of said transmission channel in conjunction with the number of frames per second at which said transmitter transmits the said transcoded data stream.

2. The system of claim 1 wherein said data stream is stored on a storage medium prior to being transcoded.

3. The system of claim 2 wherein said first number of controller controls said bit rate and said frame rate based on a constraint on the end-to-end delay between a sender and a receiver.

4. The system of claim 1 wherein said data stream includes video.

5. The system of claim 1 wherein said data stream includes audio.

6. The system of claim 5 wherein said data stream includes video.

7. The system of claim 1 wherein said transcoding includes modifying the spatial and temporal resolution of the data stream.

8. The system of claim 1 wherein said transcoding includes modifying the compression format.

9. The system of claim 1 further comprising a transmission monitor that estimates at least one of the bandwidth of a channel that said transcoded data stream is transmitted through and the status of the system.

10. The system of claim 9 wherein said transmission monitor estimates a fullness of a transmission buffer of said system.

11. The system of claim 9 wherein said transmission monitor estimates a fullness of a receiving buffer of said system.

12. The system of claim 9 wherein said transmission monitor estimates the bandwidth of said channel.

13. The system of claim 9 wherein said transcoding is based upon said estimation.

14. The system of claim 9 wherein said transmitting is based upon said estimation.

15. The system of claim 1 wherein a bit rate of said transmitted data units is greater during said first period than said second period.

16. The system of claim 1 wherein a bit rate of said transmitted frames is greater during said second period than said first period.

17. The system of claim 1 further comprising a transmission monitor estimating the available bandwidth of a channel that said transcoded data stream is transmitted through and said transcoding said data stream in such a manner so that the resulting data rate of said transmitted data stream is less than said available bandwidth.

18. The system of claim 1 wherein said first time period has a predetermined time duration.

19. The system of claim 1 wherein said transcoding is based upon information provided by a decoder.

20. The system of claim 1 wherein said transcoding results in a different bit rate than provided by said transmitter of said transcoded data stream.

21. The system of claim 1 wherein said bit rate of said frames for at least one of said first and second time period is based upon the type of video frames in said data stream.

* * * * *

UNITED STATES PATENT AND TRADEMARK OFFICE
CERTIFICATE OF CORRECTION

PATENT NO. : 7,652,994 B2 Page 1 of 1
APPLICATION NO. : 11/394573
DATED : January 26, 2010
INVENTOR(S) : Petrus J. L. van Beek

It is certified that error appears in the above-identified patent and that said Letters Patent is hereby corrected as shown below:

Col. 12, Line 10

Change "transmits the said" to read --transmits said--.

Signed and Sealed this

Fifteenth Day of June, 2010

David J. Kappos
*Director of the United States Patent and Trademark Office*